United States Patent [19]

Malish

[11] 4,302,139
[45] Nov. 24, 1981

[54] MATERIAL HANDLING IMPLEMENT PARTICULARLY SUITED FOR TRANSPORTING ROUND HAY BALES

[76] Inventor: Elton K. Malish, Rte. 2, Box 87, Taylor, Tex. 76574

[21] Appl. No.: 135,101

[22] Filed: Mar. 28, 1980

[51] Int. Cl.³ .................... A01D 87/12; A01K 5/00
[52] U.S. Cl. .................................. 414/24.5; 119/60; 414/680; 414/703; 414/912
[58] Field of Search ............... 414/24.5, 24.6, 607, 414/680, 684, 685, 697, 703, 722, 724, 785, 910, 912, 911; 119/60

[56] References Cited

U.S. PATENT DOCUMENTS

| | | | |
|---|---|---|---|
| 2,731,161 | 1/1956 | Carstens | 414/703 |
| 3,033,394 | 5/1962 | Kashergen | 414/607 X |
| 3,814,269 | 6/1974 | Blood | 414/724 |
| 3,995,594 | 12/1976 | Rose | 119/60 |
| 4,002,147 | 1/1977 | Feterl | 414/24.5 X |
| 4,120,405 | 10/1978 | Jones et al. | 414/24.5 |
| 4,230,435 | 10/1980 | Azevedo | 414/722 |

FOREIGN PATENT DOCUMENTS 7714027 12/1979 Sweden ................. 414/722
1548029 7/1979 United Kingdom ........... 414/24.5

OTHER PUBLICATIONS

John Deere Brochure—Feeding, Material Handling and Special Use Equipment, pp. 1, 21, 29, 37.
New Holland Brochure—Round Baling Systems—Models 80 and 90, 1979.

Primary Examiner—Leslie J. Paperner
Attorney, Agent, or Firm—Arnold, White & Durkee

[57] ABSTRACT

A material handling implement includes a frame member with coupling members for connecting a first end of the frame to a prime mover, such as by way of a standard three-point connection on a tractor. Pivotally mounted on the other end of the frame is a yoke, such that the arms of the yoke extend laterally to each side of the frame. A hook is secured to each arm on one face of the yoke for use in transporting other implements, for example a round hay bale feeder. An elongated spear is mounted on another face of the yoke for spearing and transporting materials, such as round hay bales. Hydraulic piston and cylinder means are provided for pivoting the yoke to alternately position the hooks and the spear for use.

4 Claims, 6 Drawing Figures

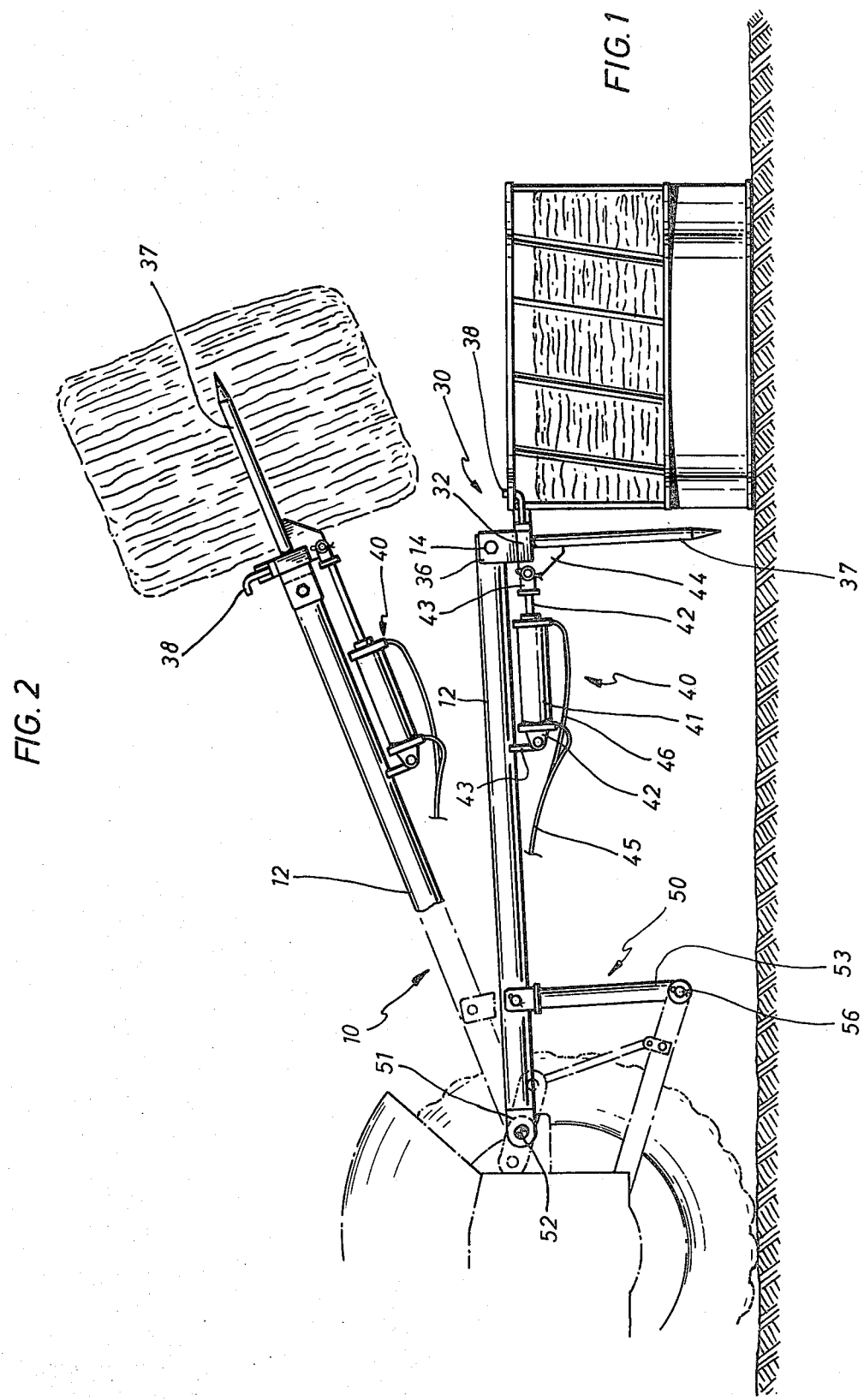

MATERIAL HANDLING IMPLEMENT PARTICULARLY SUITED FOR TRANSPORTING ROUND HAY BALES

BACKGROUND OF THE INVENTION

1. Field of the Invention

This invention relates generally to a material handling implement, and more particularly to an implement suited for attachment to a tractor for handling and transporting round hay bales.

2. Prior Art

Somewhat recently, machinery has been developed for picking up hay in the field and rolling the hay into round bales, weighing on the order of from about 1,200 to 1,500 pounds and being on the order of 6 to 7 feet in diameter.

In the past, these round bales have been transported by front-end loaders or other similar equipment. Additionally, material handling implements have been designed for attachment to the rear of a tractor for transporting such bales. Examples are Models 80 and 90 Bale Movers sold by Sperry New Holland. The Model 80 Bale Mover includes a pair of elongated tines attached to a framework, resembling a forklift mechanism; and may optionally include a pivotal push-off bar. However, this Model 80 has limited displacement capabilities. The Model 90 Bale Mover is a more sophisticated and expensive assembly with opposed sets of prongs on a framework for stabbing the bales, with the framework being vertically displaceable on an elevator-like assembly for lifting the bales onto flatbeds or for stacking.

These particular prior art devices have inherent disadvantages by virtue of their limited functional characteristics, their limited displacement capabilities, and their cost.

SUMMARY OF THE INVENTION

The present invention overcomes these prior art shortcomings through a material handling implement, which in one aspect of the invention, includes an elongated frame having a first coupling member on one end of the frame and a pair of additional coupling members interconnected to the frame adjacent that first end. By this arrangement, the frame may be connected to a prime mover, such as a tractor, so that the frame may be pivoted about the point of interconnection by the first coupling member to raise and lower the second end of the frame. An elongated spear is mounted on the second end of the frame for insertion into a bundle of material, such as a round hay bale, for transporting that material as pierced by and supported on the spear.

Preferably, the spear is pivotally mounted on the frame, such that the spear may be pivoted from a first position where the spear extends rearwardly away from the frame and a second position where the spear extends downwardly for ejecting the transported material. In the most preferred embodiment, a hydraulic piston and cylinder arrangement is mounted on the frame for pivoting the spear.

In another aspect of the invention, the spear is securely mounted on a bar which is pivotally mounted to the frame. Preferably, this bar extends laterally to each side of the frame, with hooks being mounted adjacent each end of the bar for use in transporting other implements, such as a round hay feeder.

In the preferred embodiment, a pair of bracing arms extend downwardly and laterally of the frame adjacent the front-end thereof. A coupling member is attached to the end of each bracing arm such that the three points for coupling the frame member to a prime mover are a standard 3-point hitch arrangement.

Accordingly, the present invention provides several advantages over the prior art implements. First, the invention is economical and can be quickly and conveniently installed in a 3-point hookup on a tractor. Second, the implement is capable of lifting the transported round hay bales to a sufficient height for either loading the round bales two-high on a trailer or lifting the bales over a fence for deposit on the other side of the fence without having to open a gate. Additionally, the implement of the present invention includes the pivotal spear, so that the displacement hooks can be pivoted into position for transporting other implements such as a round hay feeder.

These and other advantages and meritorious features of the present invention will be more fully appreciated from the following detailed description and the appended claims.

BRIEF DESCRIPTION OF THE DRAWINGS

FIG. 1 is a side elevational view of the material handling implement of the present invention, as interconnected with a tractor and as manipulated for lifting a round hay feeder.

FIG. 2 is a fragmented view illustrating the end of the present implement in the position for transporting a round hay bale.

DETAILED DESCRIPTION OF THE PREFERRED EMBODIMENT

Figure 3:
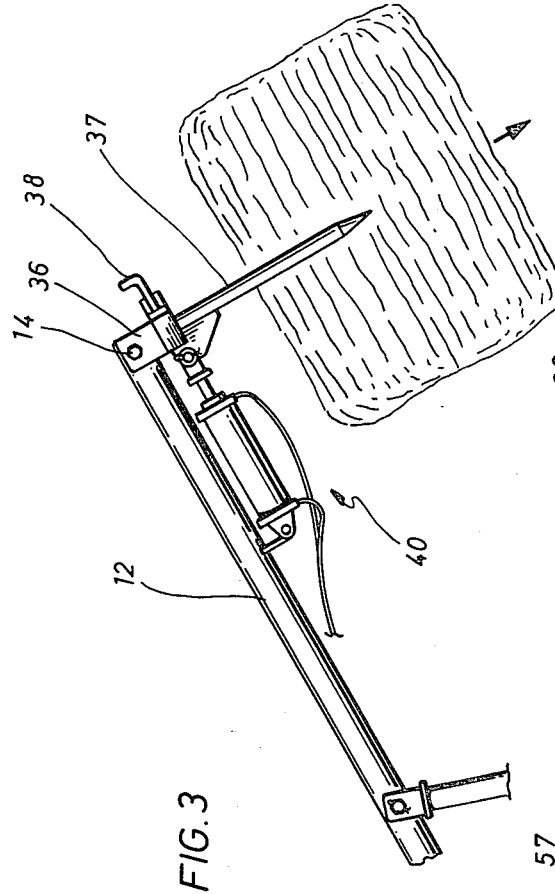
FIG. 3 is a fragmented view similar to FIG. 2, but illustrating the pivotal spear in a position for dropping or ejecting a round hay bale.

The implement of the present invention, as indicated generally by reference numeral 10, includes an elongated frame 12, a pivotal displacement assembly 30 at the rear end of the frame, a hydraulic means 40 for pivoting the displacement assembly 30, and a coupling assembly 50 at the forward end of the elongated frame. As shown best in FIGS. 1 and 4, the elongated frame may be made of any suitable material, but in the preferred embodiment is comprised of an 8 foot section of pipe.

The pivotal transport assembly 30 includes an elongated bar or yoke 32 which is pivotally connected at about its mid-point to the aft end of the elongated frame such that the bar extends laterally to each side of the frame. The pivotal connection includes flanges 34 and 36 which may be suitably secured, such as by welding, to one face of the bar 32. These flanges 34 and 36 preferably include circular openings which receive circular, opposed, laterally extending shafts 14 and 16 secured, for example by welding, to the trailing end of the elongated frame 12.

An elongated spear 37 is secured to one face of the pivotal bar 32, with the length of the spear being sufficient for insertion into the material to be transported so that such material, for example a round hay bale, will be maintained on the spear during transport, as shown in FIG. 2. In the preferred embodiment, the spear 37 is an elongated metal shaft having a length of 42 inches and including a pointed end.

Mounted on another face of the bar 32 at the ends thereof are a pair of hook members 38 and 39. These members are mounted in such a manner that they extend generally rearwardly of the frame, as shown in FIG. 1, when the bar is pivoted for directing the spear 37 downwardly.

The hydraulic power source 40 includes a cylinder 41 which is pivotally connected by a standard bracket 42 to a downwardly depending plate 43 secured to the elongated frame 12. A piston rod 42 extends from the cylinder 41 and is likewise pivotally mounted by a standard bracket 43 to a plate 44 secured to the pivotal bar 32. Hydraulic lines 45 and 46 are connected, respectively, to the blind side and the rod side of the cylinder 41. These lines preferably extend to the prime mover and include at their other ends standard connections for coupling to hydraulic outlets on the prime mover.

Figure 4:
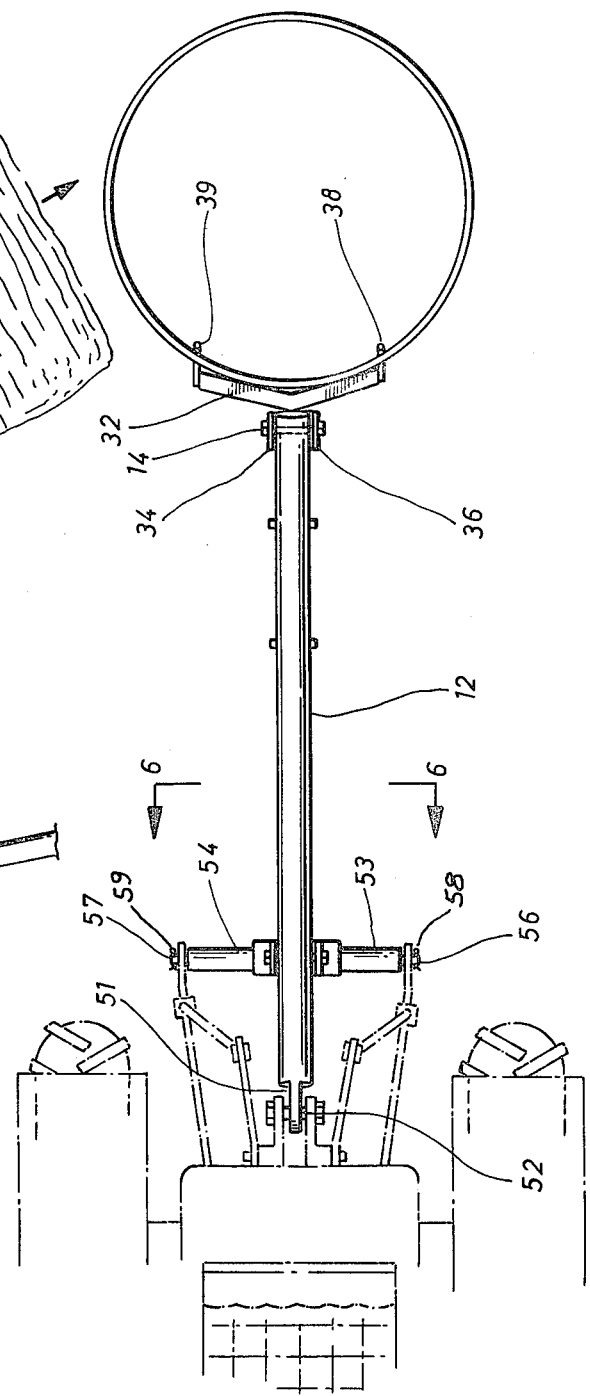
FIG. 4 is a top plan view of the overall assembly, as positioned in the manner illustrated in FIG. 1.
Figure 5:
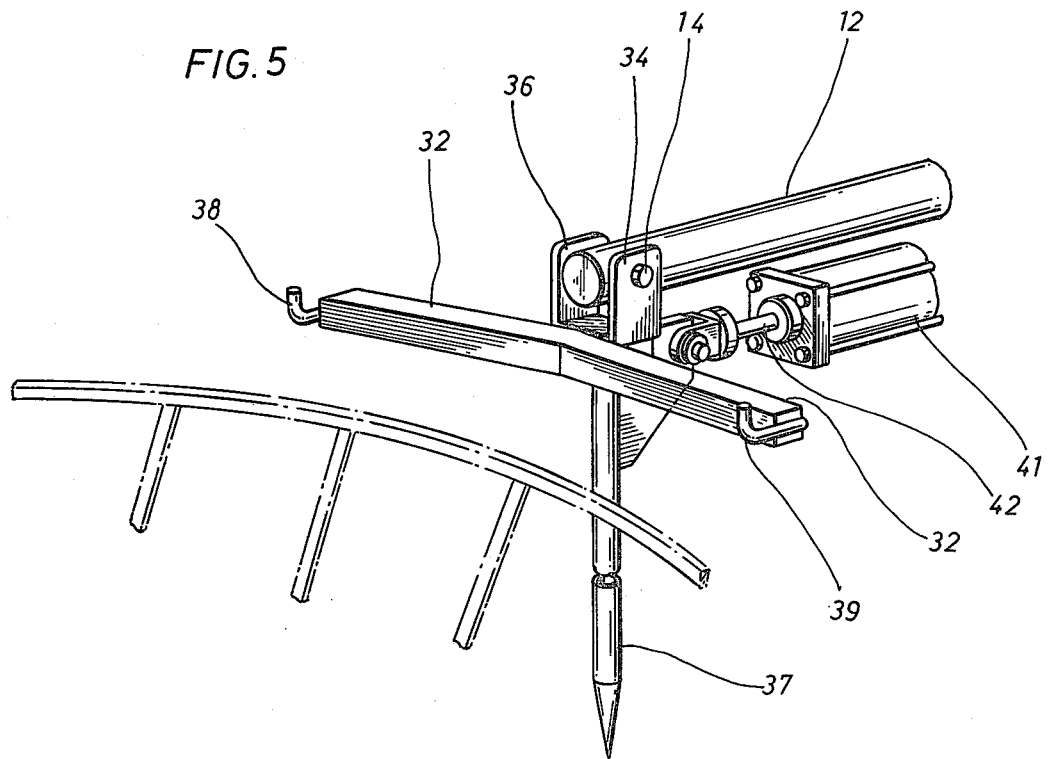
FIG. 5 is a perspective view of the yoke and hook assembly of the present invention.
Figure 6:
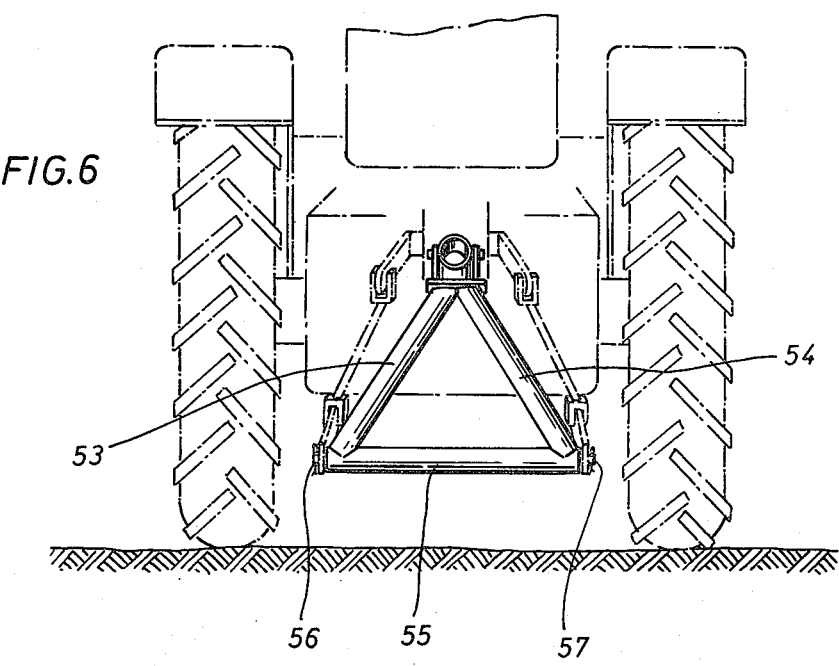
FIG. 6 is a view taken along plane 6—6 as indicated in FIG. 4, illustrating the bracing arms and coupling members at the front end of the implement.

The coupling assembly 50 includes, first, a flange 51 suitably secured, for example by welding, to the forward end of the elongated frame 12. This flange includes a circular opening 52 to accommodate the receipt of a coupling pin on the prime mover. As best shown in FIG. 6, a pair of bracing arms 53 and 54 extend downwardly and outwardly from the frame member 12. Optionally, but preferably a third bracing arm 55 is interconnected, for example by welding, between the two distal ends of the bracing arms 53 and 54. Coupling shafts 56 and 57 extend outwardly on each side of each of the respective bracing arms 53 and 54 to accommodate the receipt of suitable coupling members on the tractor, as best shown in FIG. 4. The shafts 56 and 57 preferably include diametral bores therethrough to receive cotter pins 58 and 59, or the like, to maintain the prime mover connections in place on the shafts.

Accordingly, the material handling implement of this invention can be coupled to a prime mover, such as a tractor, relatively quickly and easily. The hookup is accomplished by interconnecting flange 51 to a stationary point on the tractor and by coupling displaceable arms of the tractor onto the shafts 56 and 57. In this arrangement, lifting of the arms on the tractor causes the implement to pivot about opening 52 on the flange 51, such that the aft end of the implement can be lifted to substantial heights. In addition to the hookup of the coupling assembly 50, hydraulic fluid lines 45 and 46 must be coupled to appropriate hydraulic outlets on the prime mover.

In use, hydraulic fluid will be supplied by way of line 45 to the blind end of cylinder 41, causing the bar 32 to be pivoted to a position such that spear 37 extends generally rearwardly of the frame 12. Then, the tractor may be driven backwardly so that the spear 37 will stab a round hay bale approximately through its axis. Next, the tractor hitch arms may be raised to cause the frame 12 to be pivoted upwardly to an inclination such as shown in FIG. 2. In this position, the round hay bale may be displaced on the material handling implement without becoming dislodged.

At the point where it is desired to place the hay bale, hydraulic fluid is supplied to the rod end of cylinder of 41 by fluid line 46, pivoting bar 32 and spear 37 to the position shown in FIG. 3 so that the round hay bale may drop by gravity.

Additionally, with the bar 32 positioned as shown in FIG. 1, the implement may be used to transport other devices. For example, the tractor may be backed into a position such that hooks 38 and 39 are positioned under a supporting structure of a round hay feeder. The lifting arms on the tractor may be raised to pivot the frame 12 upwardly to lift and then transport the round feeder. During such lifting and transport, the spear 37 serves as a supporting structure against which a portion of the feeder rests.

It will be appreciated by those skilled in the art that the present invention may be put to other uses or used in the manner described herein but with slight variations. Additionally, modifications may be made to the disclosed embodiment without departing from the true spirit of the invention. For example, other types of coupling members or coupling arrangements may be provided. A single hook could be provided on the bar and the bar itself may be shortened or lengthened, as desired.

Having therefore sufficiently and completely described my invention, I now claim:

1. A material handling implement, comprising:
   a frame member having coupling means on a first end thereof for hitching the frame to a prime mover such that the second distal end of the frame may be raised and lowered;
   a yoke pivotally mounted to the second end of the frame, such that opposed arms of the yoke extend laterally to each side of the frame;
   a hook secured to each arm of the yoke to extend generally rearwardly of the frame when the yoke is in a first pivoted position, so that the hooks may be used for transporting and placing equipment such as round hay bale feeders;
   a spear mounted on the yoke such that the spear extends generally downwardly when the yoke is in the first pivoted position and extends generally rearwardly of the frame when the yoke is in a second pivoted position; and
   means for pivoting the yoke between said first and second pivoted positions said pivoting means including a hydraulic piston and cylinder interconnected between the frame and the yoke and including hydraulic fluid lines for interconnection to the hydraulic power source of the prime mover.

2. The implement as defined in claim 1, characterized by said coupling means including a first coupling member on the first end of the frame, a pair of bracing arms extending downwardly and laterally of the frame, and a coupling member on the ends of each of the arms, thereby defining a three-point connection for interconnection to the prime mover.

3. A material handling implement particularly suited for transporting rolled circular hay bales and for placing bale feeders around such circular hay bales, comprising:
   an elongated frame including a coupling member at one end thereof for connection to a prime mover, such as a tractor,
   a pair of brace arms connected to the underneath side of the elongated frame adjacent said one end and extending downwardly and outwardly from the frame, a connection bracket on the distal end of each brace arm, such that the brace arm brackets and the coupling member on the frame form a three-point connection for interconnection to a tractor;

a dual purpose member pivotally connected to the other end of the elongated frame including (a) an elongated bar pivotally connected to the frame at about the midpoint of the bar such that the bar extends laterally to each side of the frame, (b) a hook member secured adjacent each end of the bar to extend rearwardly away from the other end of the frame when the bar is in a first pivoted position, and (c) an elongated spear secured to approximately the midpoint of the bar to extend downwardly when the bar is in a first pivoted position and to extend rearwardly away from the frame when the bar is in a second pivoted position; and a hydraulic piston and cylinder interconnected between the frame and the bar for pivoting the bar between said first and second positions.

4. An implement for attachment to a prime mover and adapted for handling bales of material, comprising:

an elongated frame member having a first coupling member adjacent the first end of said frame member for connection to the prime mover, said frame member having sufficient strength to support a bale of material carried by its second end;

a bracing frame section connected to the elongated frame member adjacent the first end of said frame member and extending downwardly from the frame member;

a pair of connector brackets connected to and spaced along the lower portion of said bracing frame section, such that the connector brackets and the first coupling means on the elongated frame form a three-point connection to the prime mover whereby the entire implement may be pivoted by the prime mover;

an elongated spear pivotally connected to the second end of the elongated frame member, said spear extending downwardly in a first pivoted position and extending rearwardly away from the elongated frame when in a second pivoted position;

a bar connected to the spear adjacent the point of connection between said spear and said frame member, said bar extending laterally to each side of the spear;

a hook member secured to the bar and extending rearwardly away from the prime mover when the spear is in the first pivoted position; and a hydraulic piston and cylinder assembly interconnected between the elongated frame and the spear for selectively pivoting the spear between said first and second positions.

* * * * *